(12) United States Patent
Last (10) Patent No.: US 7,690,528 B2
(45) Date of Patent: Apr. 6, 2010

(54) ASSEMBLY FOR A CLOSABLE FLUID CONNECTION

(75) Inventor: Laurens Last, Monaco (MC)

(73) Assignee: Itsac N.V., Curacao (NL)

( * ) Notice: Subject to any disclaimer, the term of this patent is extended or adjusted under 35 U.S.C. 154(b) by 1322 days.

(21) Appl. No.: 10/491,877

(22) PCT Filed: Oct. 7, 2002

(86) PCT No.: PCT/NL02/00642

§ 371 (c)(1),
(2), (4) Date: Aug. 27, 2004

(87) PCT Pub. No.: WO03/031161

PCT Pub. Date: Apr. 17, 2003

(65) Prior Publication Data

US 2004/0265420 A1    Dec. 30, 2004

(30) Foreign Application Priority Data

Oct. 8, 2001    (NL) .................................... 1019138

(51) Int. Cl.
*B65D 41/18* (2006.01)
*B67D 5/00* (2006.01)

(52) U.S. Cl. .................... 220/787; 220/789; 222/507

(58) Field of Classification Search .............. 220/787, 220/788, 789; 215/256; 222/147, 507, 523
See application file for complete search history.

(56) References Cited

U.S. PATENT DOCUMENTS

| | | | |
|---|---|---|---|
| 2,552,918 A * | 5/1951 | Becker ........................ 220/787 |
| 3,461,488 A | 8/1969 | Croyle | |
| 4,375,864 A * | 3/1983 | Savage ........................ 222/81 |
| 5,232,125 A * | 8/1993 | Adams ....................... 222/83.5 |
| 5,370,270 A * | 12/1994 | Adams et al. ................. 222/88 |
| 5,392,939 A * | 2/1995 | Hidding et al. ............. 215/265 |
| 5,937,921 A * | 8/1999 | Guglielmini ................ 141/351 |

(Continued)

FOREIGN PATENT DOCUMENTS

DE    1163527    2/1964

(Continued)

*Primary Examiner*—Anthony Stashick
*Assistant Examiner*—James N Smalley
(74) *Attorney, Agent, or Firm*—Hoffman & Baron, LLP (57) ABSTRACT

A mould and method for the injection-moulding of an assembly for creating a closable fluid connection, and an assembly. The assembly comprises a female element (20) and a stopper (30) which is used to close off a bore (27) in the female element (20). The mould comprises a core with a core (2) with a core body (3) and a head (4). Furthermore, the mould comprises a mould ring which is composed of a plurality of mould parts (10, 11) are designed in such a manner that the mould cavity for the stopper (30), is located at a distance from the mould cavity for the female element (20). The mould parts (10, 11) of the mould ring which lie around the core (2) together delimit an annular sealing surface (15), by means of which the mould ring, in a zone between the mould cavity for the stopper (30) and the mould cavity for the female element (20), bears in a sealing manner against the core (2) during the injection moulding, so that the mould cavities are completely separated from one another.

20 Claims, 6 Drawing Sheets

U.S. PATENT DOCUMENTS 6,161,711 A * 12/2000 Miceli et al. ............ 215/206
6,354,473 B1 * 3/2002 Brambach et al. ......... 222/507
6,921,113 B1 * 7/2005 Vlasblom .................. 285/307

FOREIGN PATENT DOCUMENTS

| WO | 94/29215 | 12/1994 |
|----|----------|---------|
| WO | 95/22494 | 8/1995 |
| WO | 99/05446 | 2/1999 |
| WO | 00/07902 | 2/2000 |
| WO | 00/68607 | 11/2000 |

* cited by examiner

ASSEMBLY FOR A CLOSABLE FLUID CONNECTION

CROSS-REFERENCE TO RELATED APPLICATIONS

This application is the national stage filing under 35 U.S.C. §371 of PCT/NL02/00642, filed Oct. 7, 2002, which claims priority to NL 1019138, filed Oct. 8, 2001 which is incorporated herein by reference.

FIELD OF THE INVENTION

The present invention relates to an assembly for creating a closable fluid connection and to the injection-moulding of an assembly for a closable fluid connection.

The assembly for creating a closable fluid connection comprises a female element and an associated stopper, the female element having a body with a bore which extends through the body and with a seat, which extends around the bore, for the stopper, which is used to close off the bore.

According to a first aspect, the present invention relates to the injection-moulding of an assembly for a closable fluid connection, in particular to an injection mould and the use of this mould.

The second aspect of the invention relates to an assembly for creating a closable fluid connection.

BACKGROUND OF THE INVENTION

A mould for the injection-moulding of an assembly of the above-mentioned type for creating a closable fluid connection is known, for example, from NL 1012020. In this known mould, it is provided that the mould cavity for the stopper is in communication, via a narrow annular gap, with the mould cavity for the female element, so that during injection moulding an integral film joint is formed between the two components of the assembly.

Furthermore, in the known mould it is provided that the plastics material is injected via a first runner which opens out in the mould cavity for the stopper. The plastics material then passes into the mould cavity for the female element via the narrow annular gap.

After the assembly has cooled, in the known mould the mould parts which form the mould ring are moved apart, and then the core is pulled out. In the process, the stopper becomes clamped onto the head of the core, and as a result the integral film joint between the stopper and the female element tears and the stopper moves into the seat of the female element. Then, the head of the core is uncoupled from the stopper, and the assembly, which is now in its closed state, can be ejected from the mould.

WO 99/05446 has disclosed an assembly for creating a closable fluid connection in which the stopper is integral, via flexible arms, with the female element. The injection mould used has a core with a head which defines the interior of the stopper and with a core body which defines the bore in the female element. Furthermore, the mould has a mould ring, which is composed of two mould parts, with a parting plane in the plane of the arms. These mould parts, together with the core, form a single mould cavity for the female element, the stopper and the flexible arms. The stopper becomes clamped onto the head of the core and can be pulled into the seat in the female element as a result of the core being pulled out.

WO 93/07084 has disclosed an assembly in which the female element is designed to be secured in the neck of a dimensionally stable vessel, in particular a water tank. In this case, the stopper and the female element are produced in separate injection moulds and are assembled subsequently.

The fluid may be any type of flowing material, such as a liquid, a fluid substance, a gas, a (fine) powder, etc. Therefore, assemblies of this type have a wide range of applications. For this reason, the assemblies are generally produced in very large numbers, and consequently the cost price has to be as low as possible.

WO 99/05446 has also disclosed an assembly in which the stopper is provided, on the side which faces the female element, with elastic hook members, each hook member having both an inwardly directed hook surface and an outwardly directed hook surface.

The bore in the female element forms an annular shoulder, behind which the outwardly directed hook surfaces engage when the stopper is in its seat. The inwardly directed hook surfaces can engage on a shoulder of a male element which is to be fitted into the bore and the stopper.

OBJECTS OF THE INVENTION

It is an object of the first aspect of the present invention to provide an improved mould with which it is possible to injection mould an improved assembly.

It is an object of the second aspect of the invention to provide an improved assembly.

In particular, it is an object of the second aspect of the invention to provide an assembly with an improved action of the hook members.

SUMMARY OF THE INVENTION

The first aspect of the present invention proposes a mould according to the preamble, which is characterized in that the core and the mould parts are designed in such a manner that the mould cavity for the stopper is situated at a distance from the mould cavity for the female element, and in that the mould parts of the mould ring which lie around the core together delimit an annular sealing surface, by means of which the mould ring, in a zone between the mould cavity for the stopper and the mould cavity for the female element, bears in a sealing manner against the core during injection moulding, so that the mould cavities are completely separate from one another, and in that one or more second runners are provided, which open out in the mould cavity for the female element.

The fact that the mould according to the invention provides both a mould cavity for the stopper and a completely separate mould cavity for the female element and, moreover, that in the mould according to the invention one or more separate runners for the molten plastic are associated with each mould cavity, means that various drawbacks of the moulds according to the prior art are eliminated and new possibilities are obtained.

By way of example, one of the drawbacks of the mould described in NL 1012020 is that a high injection pressure is required in order to force the molten plastic through the narrow gap, resulting in the formation of undesirable stresses in the assembly. Furthermore, the narrow gap makes it difficult to impart an additional pressure to the mould cavity for the female element after filling, which has an adverse effect on the dimensional accuracy.

Another drawback of NL 1012020 is that the shrinkage of the female element and of the stopper is identical after injection moulding, which makes it difficult to achieve the desired sealing action.

With the mould according to the invention, it is possible to obtain optimum injection of plastics material into each of the mould cavities.

It is particularly advantageously possible to inject a first plastics material into the mould cavity for the stopper and a second plastics material into the mould cavity for the female element.

The plastics materials may be significantly different plastics materials, although it is also conceivable, for example, for the differences to be minor. By way of example, it is possible for only the colour or the elasticity, the shrinkage, etc. to differ.

In an advantageous method with uses the mould according to the invention, it is provided that the first plastics material, used for the stopper, after cooling has a different hardness from the second plastics material, used for the female element.

The use of different plastics materials, in particular of materials with hardnesses which ultimately differ, can advantageously be exploited in order to obtain a reliable seal between the stopper and the female element.

In one possible embodiment, the stopper has a lower hardness than the female element, although the reverse is, of course, also possible with the mould according to the invention.

The injection of the first and second plastics materials into the respective mould cavities preferably takes place substantially simultaneously, in order in this way to achieve a production rate which is as high as possible.

The mould according to the invention also makes it possible for a plastics material to be injected only into the mould cavity for the female element or into the mould cavity for the stopper, while no plastics material is injected into the other mould cavity. As a result, the mould can then be used to produce only female elements or only stoppers.

The second aspect of the invention relates to an assembly for creating a closable fluid connection, which assembly comprises a female element and a stopper, the female element having a body with a bore which extends through the body and with a seat, which extends around the bore, for the stopper, which stopper is used to close off the bore.

The second aspect of the invention provides an assembly comprising a female element and a stopper, the female element having a body with a bore which extends through the body and with a seat, which extends around the bore, for the stopper, which stopper is used to close off the bore, which is characterized in that the stopper is provided with one or more first hook members and with one or more second hook members, the first hook members each having an outwardly directed hook surface and the second hook members each having an inwardly directed hook surface.

The second aspect according to the invention makes it possible to separately optimize the action of the first hook members and the second hook members. It will be clear that in this solution the designer then has a great deal more freedom than with the hook members according to the prior art.

The first and second hook members are preferably arranged alternately around the circumference of the stopper.

In a preferred embodiment, the assembly also comprises a male element having a tube-shaped part which fits into the bore in the female element and is provided with an internal passage for the fluid, the male element having a head and a shoulder which lies behind the head, and having a recess for accommodating the inwardly facing hook members of the stopper, with the result that the stopper is coupled to the male element.

It will be clear that the assembly according to the second aspect of the invention may if desired be produced using the mould and injection-moulding method according to the first aspect of the invention. On the other hand, it will also be clear that the assembly according to the second aspect of the invention can also be produced using moulds and methods in accordance with the prior art.

The aspects of the invention will be explained in more detail below with reference to the drawing.

DETAILED DESCRIPTION OF THE INVENTION

Figure 1:
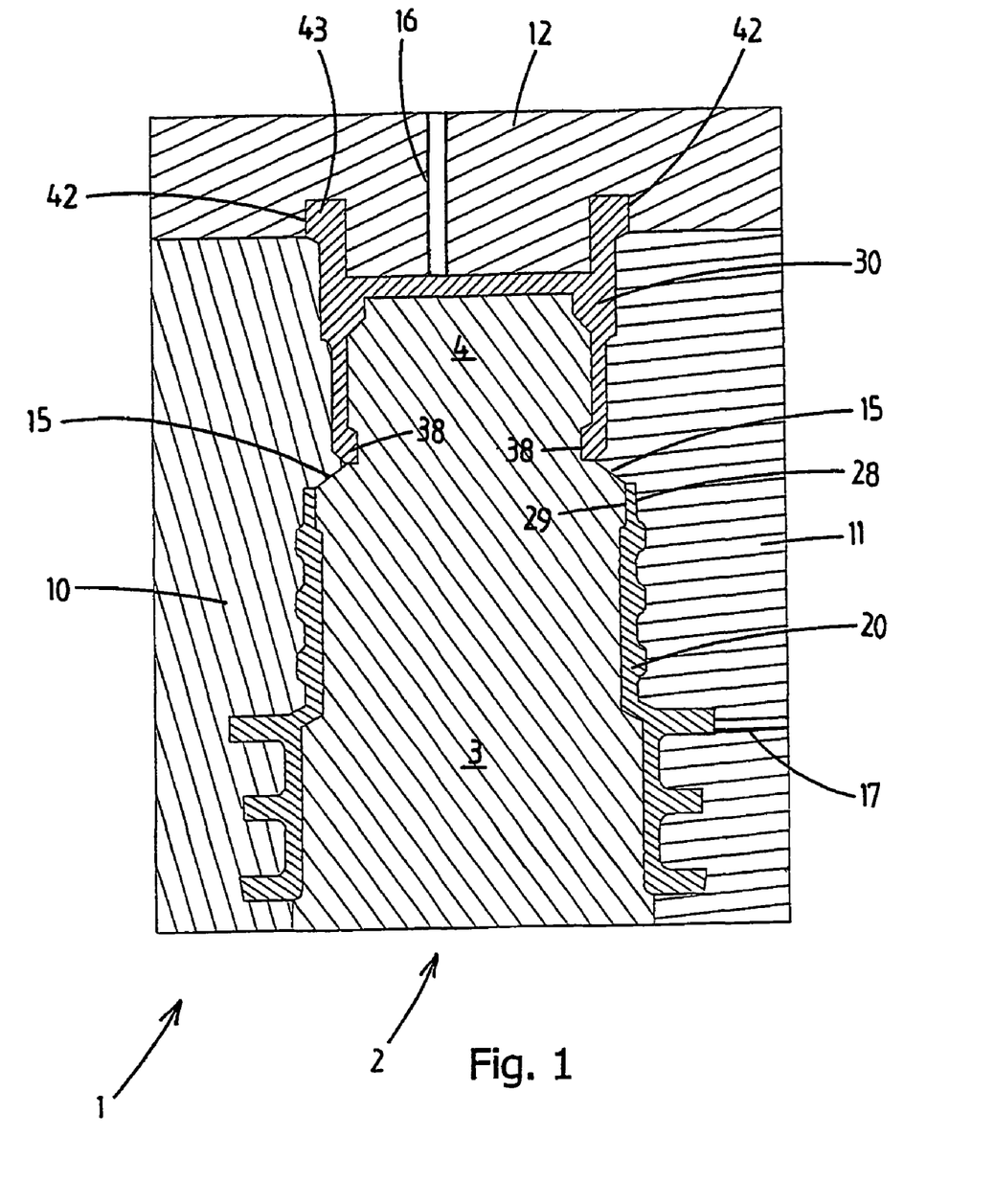
FIG. 1 shows a cross section through a preferred embodiment of the mould according to the invention after the injection-moulding of the plastics material.
Figure 2:
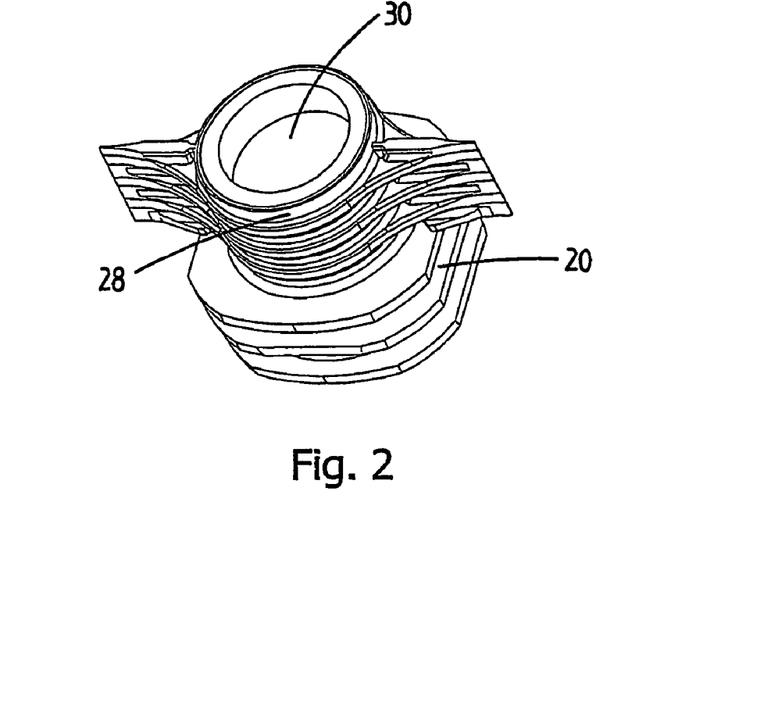
FIG. 2 shows a perspective view from the side of the stopper of the assembly which has been produced using the mould shown in FIG. 1.
Figure 3:
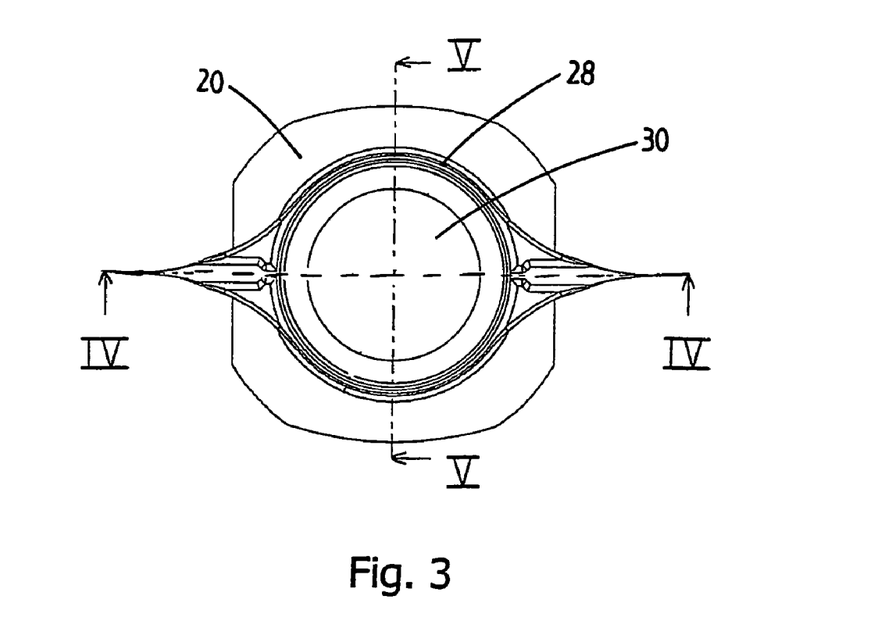
FIG. 3 shows the assembly from FIG. 2 in a view from the side of the stopper.

FIG. 1 shows a mould 1 for the injection-moulding of an assembly for creating a closable fluid connection, which assembly comprises a female element 20 and an associated stopper 30.

To make it easier to interpret FIG. 1, the design of the assembly which is to be injection-moulded using the mould will now be explained with reference to FIGS. 2-6.

The assembly which is shown is intended to create a fluid connection for, for example, liquid, gas, fluid substances, powders, such as for example soap, cosmetic cream, beverages, syrup, etc.

The female element 20 has a body with a front side 25 and a rear side 26, an axial, substantially cylindrical bore 27 extending through the body from an insertion opening 24 for a male element at the front side 25, which bore 27 is open at both its ends.

On the rear side 26, the bore 27 is delimited by a projecting annular wall 28 of the body. The inner side of the annular wall 28 forms a seat 29, which extends around the bore 27, for the stopper 30, which stopper 30 is used to close off the bore 27.

The bottom part of the body of female element 20 is designed in particular to be sealed between two walls of a flexible plastic pouch.

In an embodiment which is not shown, the body of the female element could also, in a different design, be formed so that it can be placed into the neck of a bottle, tank or other container or the like or in an annular securing member arranged on a flexible pouch. The latter design is known in particular for what are known as bag-in-box systems.

In addition, the assembly of stopper and female element may also have an associated male element (not shown), which has a tubular part which fits into the bore 27 in the female element 20 and has a head at the end. In the male element, there is an internal axial passage for the fluid. The axial passage is open at one end and is provided with one or more openings at the head at the other end. By way of example, the male element is provided with a number of transverse passages which connect the axial passage, in the vicinity of a blind end thereof, to the outer circumference of the male element.

The stopper 30 has an annular wall 31 and an end wall 32 and a cavity 33 which is open towards the insertion opening 24, which cavity 33 is intended to receive the head of the male element.

The end wall 32 forms a cylindrical recess 34, the diameter of which is matched to the diameter of a cylindrical projection of the head of the male element. This complementary shape ensures that the stopper 30 remains in the correct position on the head and cannot tilt.

Figure 6:
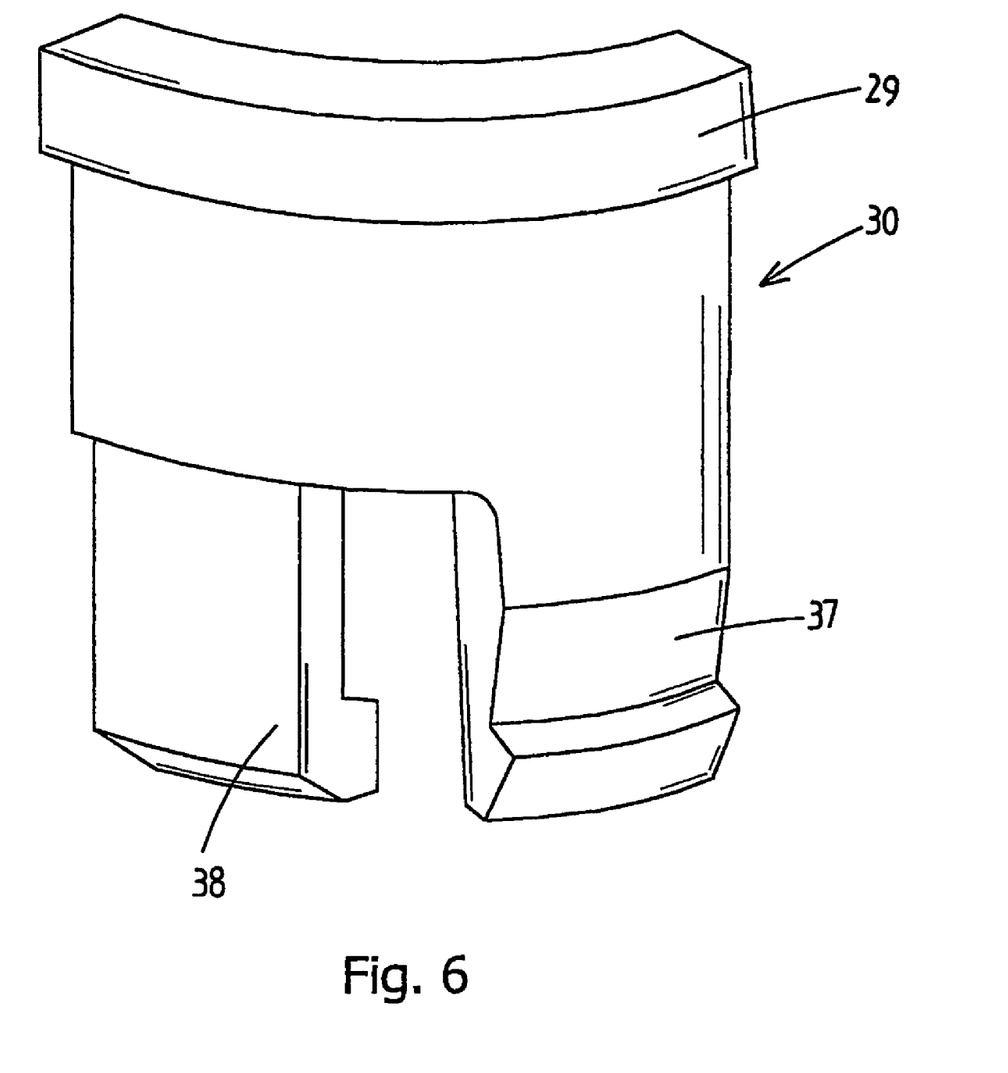
FIG. 6 shows a quarter segment of the stopper shown in FIGS. 1-5 in accordance with the second aspect of the invention.

As can be seen inter alia from FIG. 6, the stopper 30 has hook fingers 37, 38 arranged around the circumference on the side which faces the insertion opening 24 of the female element 20.

In this arrangement the first hook fingers 37 only have an outwardly facing hook surface, and the second hook fingers 38 only have an inwardly facing hook surface. The first and second hook fingers 37, 38 are in this case arranged alternately, for example two or four of each type being present.

The hook fingers 37, 38 can spring radially inwards and outwards under the influence of the forces acting on the hook fingers 37, 38. In this context, the sprung action can be tuned by suitable dimensioning of the hook fingers, in particular the length and cross section of the hook fingers. In particular, the sprung action of the hook fingers 37 can be tuned independently of that of the hook fingers 38.

Figure 4:
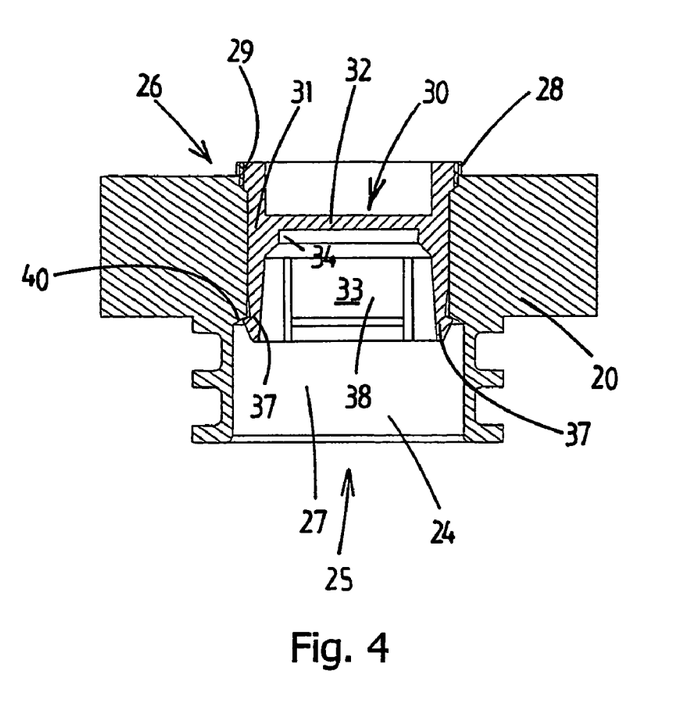
FIG. 4 shows a cross section on line IV-IV in FIG. 3.
Figure 5:
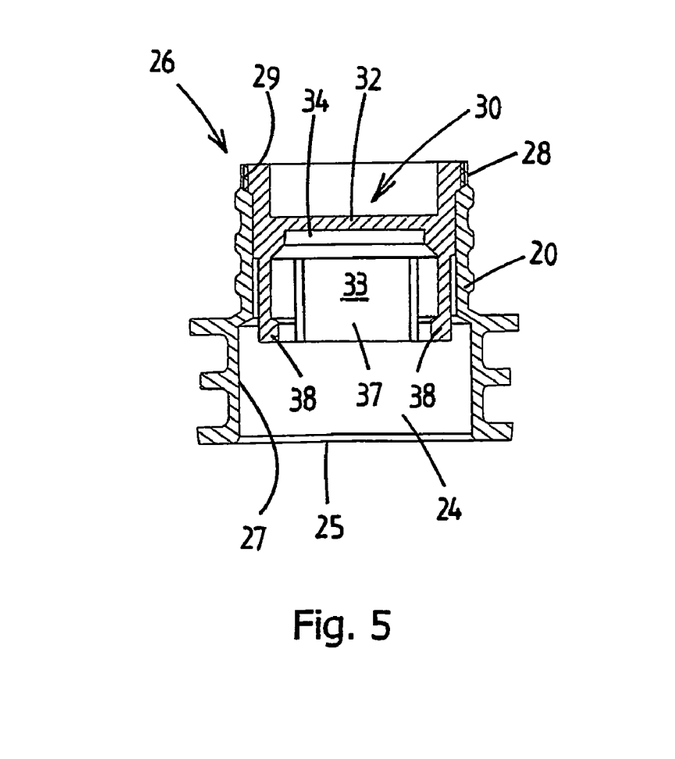
FIG. 5 shows a cross section on line V-V in FIG. 3.

In the closed position of the stopper 30, the outwardly facing hook fingers 37 engage behind a shoulder surface 40 of the female element 20 and in this way contribute to holding the stopper 30 in the seat (FIG. 4).

Figure 7:
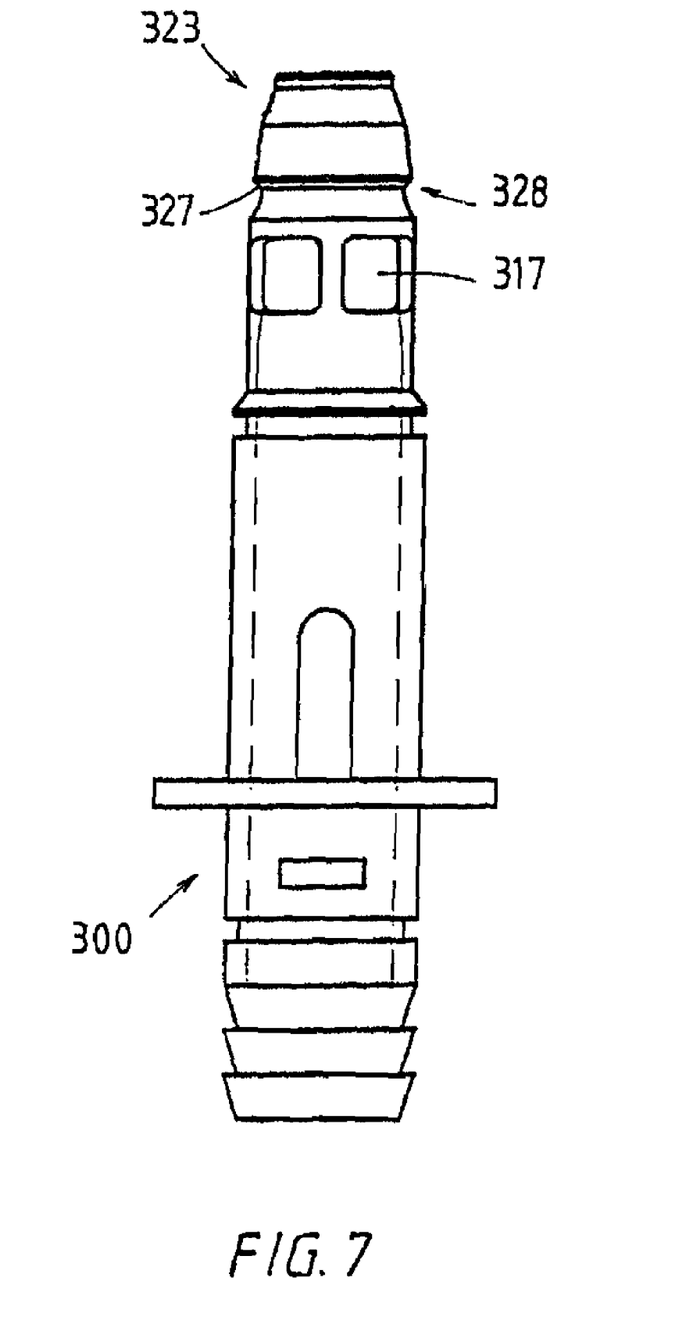
FIG. 7 shows an example of a male element to be used in combination with an assembly according to the invention.

An example of a male element 300 to engage with the stopper 30 is shown in FIG. 7. The male element 300 has a tube-shaped part which fits into the bore 27 in the female element 20 and is provided with an internal passage 317 for the fluid. The male element 300 has a head 323 and a shoulder 327 which lies behind the head 323, and the male element 300 has a recess 328 for accommodating the inwardly directed hook surfaces of the second hook members 38 of the stopper 30.

The inwardly facing hook fingers 38 are intended to engage behind an associated shoulder surface of the head of the male element, in order in this way to hold the stopper 30 on the head of the male element when the stopper 30 is pulled into seat 29.

As will be explained below, the inwardly facing hook fingers 38 also play a roll in relation to the injection-moulding and ejection of the assembly.

Figure 8:
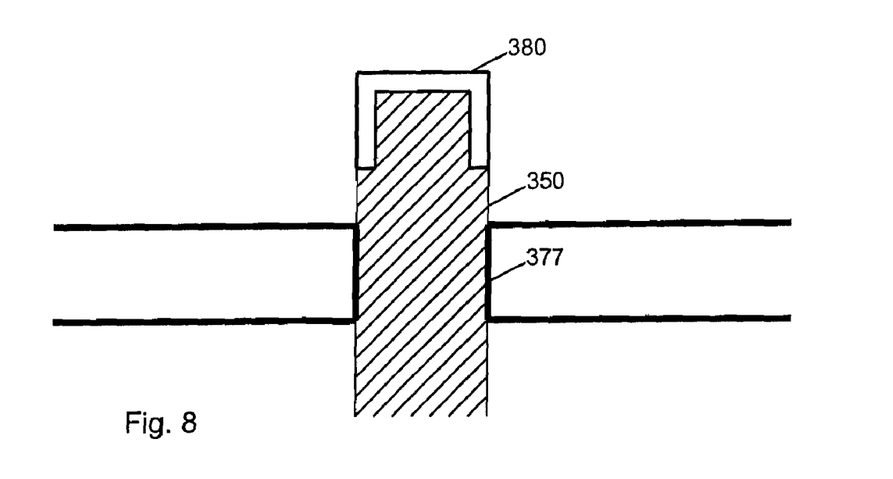
FIG. 8 shows a schematic representation of a male element fitted completely into an assembly according to the invention.

FIG. 8 shows a schematic representation of a male element 350 fitted completely into a bore 377. In this example, the stopper 380 is clear of the bore 377.

Figure 9:
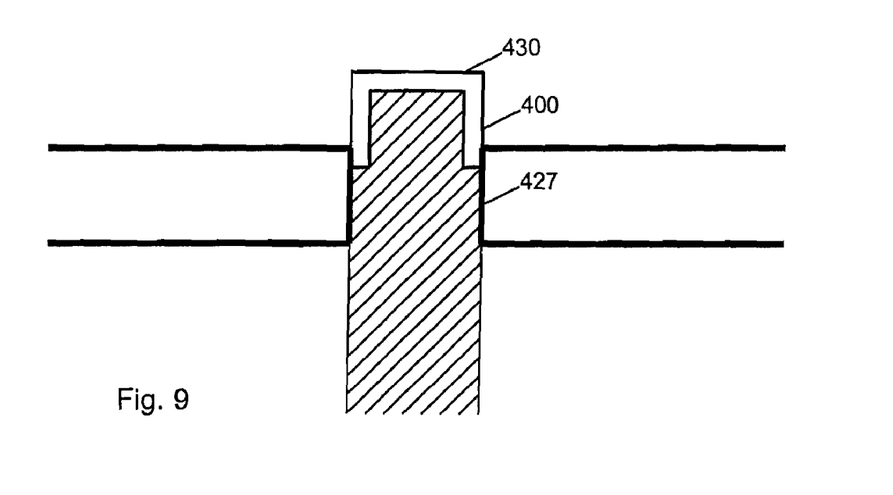
FIG. 9 shows another schematic representation of a male element fitted completely into an assembly according to the invention.

FIG. 9 shows another schematic representation of a male element 400 fitted completely into a bore 427. In this example, the stopper 430 projects part way into the bore 427.

In a variant which is not shown, it is possible for the stopper to be provided with an encircling collar instead of hook fingers, as is known, for example, from WO 99/05446.

The mould 1 comprises a core 2 with a pin-shaped core body 3 and with a head 4, which forms the free end of the core 2.

The head 4 of the core 2 defines the cavity 33 in the stopper 30. The core body 3 defines the bore 27 in the female element 20.

Furthermore, the mould 1 comprises a mould ring which extends around the core 2 and has a first mould part 10 and a second mould part 11, which each extend over 180° around the core 2 and over the length of the core 2. Furthermore, the mould 1 comprises a third mould part 12, which extends transversely with respect to the head of the core 2.

The mould parts 10, 11, 12 together with the core 2, form a mould cavity for the stopper 30 and a mould cavity, which lies in line with the mould cavity for the stopper 30, for the female element 20.

The mould parts 10, 11, 12 can be moved apart in order for the assembly to be ejected after injection-moulding.

The core 2 and the mould parts 10, 11, 12 are designed in such a manner that the mould cavity for the stopper 30 is situated at a distance from the mould cavity for the female element 20.

The mould parts 10, 11 of the mould ring which lie around the core 2 together delimit an annular sealing surface 15, by means of which the mould ring, in a zone between the mould cavity for the stopper 30 and the mould cavity for the female element 20, bears in a sealing manner against the core 2 during the injection moulding, so that the mould cavities are completely separate from one another.

The mould 1 is provided with at least one first runner 16, which opens out in the mould cavity for the stopper 30, and also with at least one second runner 17, which opens out in the mould cavity for the female element 20.

During the injection-moulding of the assembly using the mould 1, it is preferable for a first plastics material to be injected into the mould cavity for the stopper 30 and for a second plastics material, which is different from the first plastics material, to be injected into the mould cavity for the female element 20.

In one possible embodiment, the first plastics material of the stopper 30, after cooling, has a different hardness from the second plastics material of the female element 20. This difference in hardness can advantageously be utilized for the sealing action of the stopper which is to be achieved and for reliable coupling of the stopper to the head of the core and/or any male element which is to be used.

If the plastics material for the female element 20 were to be relatively soft, if the female element is used in combination with a male element which is to be fitted into the bore in the female element, the relatively soft quality of the female element could be used to obtain a seal between the female element and the male element. In particular, it would be possible to dispense with a separate sealing ring between the female and male elements.

To achieve a high production rate, it is preferable for the injection-moulding of the first and second plastics materials to take place substantially simultaneously.

The head 4 of the core 2 is designed in such a manner that, after the injection-moulding, the stopper 30 is clamped to the core 2, in such a manner that, after the mould parts 10, 11, 12 which lie around the core have been moved apart, the stopper 30 can be pulled into the bore 27 in the female element 20 with the aid of the core 2, the said element 20 then being supported on an abutment (not shown).

With the stopper 30 which is illustrated, the clamping onto the core 2 is achieved in particular by the inwardly facing hook fingers 38 which are formed during the injection-moulding.

The mould 1 also makes it possible for a plastics material to be injected only into the mould cavity for the female element, without any plastics material being injected into the mould cavity for the stopper, or vice versa.

As can be seen clearly from FIG. 1, the third mould part 12 forms that wall of the mould cavity for the stopper 30 which lies opposite the head 4 of the core 2, as well as an adjoining annular mould-cavity wall 42 which corresponds to an annular sealing surface 43 of the stopper 30. In this way, the said sealing surface 43 is free of partial seams and, in the closed position of the assembly, bears against the annular seat 29, which is likewise free of partial seams, of the female element 20.

The invention claimed is:

1. An assembly for creating a closable fluid connection to be used in combination with a male element, which assembly comprises a female element and a stopper, the female element having a body with a bore which extends through the body and with a seat, which extends around the bore, for the stopper, which stopper is located in the seat and is used to close off the bore, the stopper having a side which faces the female element and a circumference, the stopper being provided on the side which faces the female element and distributed around the circumference with first hook members each having only an outwardly directed hook surface and second hook members each having only an inwardly directed hook surface, the bore of the female element forming a shoulder, behind which the outwardly directed hook surfaces of said first hook members engage when the stopper is in its seat, and the inwardly directed hook surfaces of said second hook members being engageable on a shoulder of a male element which is to be fitted into the bore of the female element.

2. An assembly according to claim 1, in which the first and second hook members are arranged alternately around the circumference of the stopper.

3. A mould for the injection-moulding of an assembly according to claim 1 for creating a closable fluid connection, which assembly comprises a female element and a stopper, the female element having a body with a bore which extends through the body and with a seat, which extends around the bore, for the stopper, which is used to close off the bore,
   the mould comprising a core with a core body and a head which forms a free end of the core, the head of the core defining a part of the stopper, and the core body defining the bore in the female body, which mould furthermore comprises a mould ring composed of a plurality of mould parts, which mould parts can be moved apart in order for the assembly to be ejected after injection-moulding, the mould ring extending around the core and, together with the core, delimiting a mould cavity for the stopper and a mould cavity, which lies in line with the mould cavity for the stopper, for the female element,
   one or more first runners being provided in the mould for supplying plastic to the mould cavity for the stopper,
wherein the core and the mould parts are designed in such a manner that the mould cavity for the stopper is situated at a distance from the mould cavity for the female element, and
   wherein the mould parts of the mould ring which lie around the core together delimit an annular sealing surface, by means of which the mould ring, in a zone between the mould cavity for the stopper and the mould cavity for the female element, bears in a sealing manner against the core during injection moulding, so that the mould cavities are completely separate from one another, and wherein one or more second runners are provided, which open out in the mould cavity for the female element.

4. Mould according to claim 3, in which the stopper has a cavity which is open on the side of the female element, substantially in line with the bore in the female element, and in which the head of the core defines the cavity in the stopper.

5. Mould according to claim 3, in which the mould ring comprises a first mould part and a second mould part, which each extend over 180° around the core and which together delimit the annular sealing surface by means of which the mould ring bears in a sealing manner against the core in a zone between the mould cavities during the injection moulding.

6. Mould according to claim 3, which comprises a mould part which delimits that wall of the mould cavity for the stopper which lies opposite the head of the core and also an adjoining annular mould-cavity wall, in accordance with an annular sealing surface of the stopper, which sealing surface, in the closed position of the assembly, bears against the annular seat of the female element.

7. Mould according to claim 3, in which the head of the core is designed in such a manner that, after the injection moulding, the stopper clamps onto the core, in such a manner that after the mould parts surrounding the core have been moved apart, the stopper can be pulled into the bore in the female element with the aid of the core.

8. Mould according to claim 3, in which the mould cavity for the stopper, on that side of the stopper which faces the female element, defines elastic hook members with inwardly and outwardly directed hook surfaces, the mould cavity for the female element forming a shoulder in the bore of the female element, behind which shoulder the outwardly directed hook surfaces engage when the stopper is in its seat, and in which the inwardly directed hook surfaces can engage on a shoulder of a male element which is to be fitted into the bore, the mould cavity for the stopper being such that one or more first hook members and one or more second hook members are formed on the stopper, distributed around the circumference, the first hook members each having an outwardly directed hook surface and the second hook members each having an inwardly directed hook surface.

9. A method for injection-moulding an assembly for creating a closable fluid connection, using a mould according to claim 3.

10. A method according to claim 9, in which a first plastics material is injected into the mould cavity for the stopper, and a second plastics material is injected into the mould cavity for the female element.

11. A method according to claim 10, in which the first plastics material, used for the stopper, after cooling has a different hardness from the second plastics material, used for the female element.

12. A method according to claim 9, in which the injection-moulding of the first and second plastics materials takes place substantially simultaneously.

13. A method for injection-moulding an assembly for creating a closable fluid connection using a mould according to claim 3, in which plastics material is only injected into one of the mould cavities, and no plastics material is injected into the other mould cavity.

14. Assembly for creating a fluid connection which is produced by injection-moulding using a mould according to claim 3.

15. An assembly for creating a closable fluid connection to be used in combination with a male element, which assembly comprises a female element and a stopper, the female element having a body with a bore which extends through the body and with a seat, which extends around the bore, for the stopper, which stopper is used to close off the bore, the stopper having a side which faces the female element and a circumference, the stopper being provided on the side which faces the female element and distributed around the circumference with first hook members each having only an outwardly directed hook surface and second hook members each having only an inwardly directed hook surface, the bore of the female element forming a shoulder, behind which the outwardly directed hook surfaces of said first hook members engage when the stopper is in its seat, and the inwardly directed hook surfaces of said second hook members being engageable on a shoulder of a male element which is to be fitted into the bore of the female element, further comprising a male element having a tube-shaped part which fits into the bore in the female element and is provided with an internal passage for the fluid, the male element having a head and a shoulder which lies behind the head, and the male element having a recess for accommodating the inwardly directed hook surfaces of the second hook members of the stopper.

16. An assembly according to claim 15, the assembly being designed in such a manner that the stopper is clear of the bore when the male element is fitted completely into the bore.

17. An assembly according to claim 15, in which the stopper projects part way into the bore when the male element has been fitted completely into the bore.

18. The assembly of claim 15, in which said first and second hook members are arranged alternately around the circumference of said stopper.

19. The assembly of claim 15, wherein said stopper comprises a cavity which is adapted to receive the head of the male element.

20. An assembly for creating a closable fluid connection to be used in combination with a male element, which assembly comprises a female element and a stopper, the female element having a body with a bore which extends through the body and with a seat, which extends around the bore, for the stopper, which stopper is used to close off the bore, the stopper having a side which faces the female element and a circumference, the stopper being provided on the side which faces the female element and distributed around the circumference with first hook members each having only an outwardly directed hook surface and second hook members each having only an inwardly directed hook surface, the bore of the female element forming a shoulder, behind which the outwardly directed hook surfaces of said first hook members engage when the stopper is in its seat, and the inwardly directed hook surfaces of said second hook members being engageable on a shoulder of a male element which is to be fitted into the bore of the female element, wherein the stopper is injection-moulded from a first plastic material, and wherein the female element is injection-moulded from a second plastic material, and wherein said first plastic material has a different hardness than said second plastic material.

* * * * *